United States Patent [19]
Dries et al.

[11] Patent Number: 5,471,477
[45] Date of Patent: Nov. 28, 1995

[54] LOGICAL MACHINE FOR PROCESSING CONTROL INFORMATION OF TELECOMMUNICATION TRANSMISSION FRAMES

[75] Inventors: Johan M. F. Dries, Noorderwijk; Yves Therasse, Chastre, both of Belgium

[73] Assignee: Alcatel N.V., Amsterdam, Netherlands

[21] Appl. No.: 995,088

[22] Filed: Dec. 23, 1992

[30] Foreign Application Priority Data

Dec. 24, 1991 [EP] European Pat. Off. .............. 91203410

[51] Int. Cl.$^6$ ..................................................... H04J 3/12
[52] U.S. Cl. ............................................ 370/110.1; 370/13
[58] Field of Search ........................... 370/60, 60.1, 94.1, 370/94.2, 110.1, 82, 92, 13; 340/825.52, 825.04, 825.07; 379/32, 33

[56] References Cited

U.S. PATENT DOCUMENTS

| | | | |
|---|---|---|---|
| 5,001,708 | 3/1991 | Williams et al. | 370/110.1 |
| 5,214,651 | 5/1993 | Baydar et al. | 370/110.1 |
| 5,237,572 | 8/1993 | Badaoui et al. | 370/110.1 |

Primary Examiner—Douglas W. Olms
Assistant Examiner—Dang Ton
Attorney, Agent, or Firm—Ware, Fressola, Van Der Sluys & Adolphson

[57] ABSTRACT

A logical machine operating according to a predetermined state diagram for performing state transitions on information in telecommunication transmission frames, each of the transmission frames having a plurality of repeated concatenation information which is indicative of the structure of the transmission frames, each of the transmission frames also having data information and pointer information which is indicative of the location of the data information in the transmission frames, characterized in that the logical machine performs the state transitions in the predetermined state diagram as a simultaneous function of all the repeated concatenation information of the transmission frame.

18 Claims, 1 Drawing Sheet

LOGICAL MACHINE FOR PROCESSING CONTROL INFORMATION OF TELECOMMUNICATION TRANSMISSION FRAMES

TECHNICAL FIELD

The present invention relates to a logical machine operating according to a predetermined state diagram wherein state transitions are performed as a function of concatenation information carried by telecommunication transmission frames, said frames also carrying data information and pointer information which is indicative of the location of said data information in said frames, said concatenation information being indicative of the structure of said data information in said frames and being repeated within the frame.

BACKGROUND OF THE INVENTION

Such a telecommunication transmission frame is for instance the so-called Synchronous Transport Module (STM) frame STM-4c used in the Synchronous Digital Hierarchy (SDH) protocol and standardized according to the CCITT Recommendations G.707, G.708 and G.709. This frame STM-4c includes a control field storing the pointer information and the repeated concatenation information, and a data field storing a single user data block, or at least a first part thereof. The pointer information indicates the start location of the data block, whilst the concatenation information indicates that the data information is constituted by a single block.

Another type of frame is time frame STM-4, also standardized according to the CCITT Recommendations G.707, G.708 and G.709, and wherein the control field stores four distinct pointer informations but no concatenation information. The data field of the frame STM-4 stores four byte-interleaved user data blocks which are thus each four times smaller than the single data block of the frame STM-4c and of which the start locations in the frame are given by respective ones of the four pointer informations.

The control field of the frame STM-4 differs from that of the frame STM-4c in that in the latter the locations of the three last pointer information are filled with three identical concatenation informations.

According to Annex B (pages 53 to 55) of the CCITT Recommendation G.783, a concatenation information as well as a pointer information are processed by a logical machine according to a first and a second state diagram respectively. A logical machine operating according to four identical second state diagrams as a function of the pointer informations is for instance required to process the four pointer informations of the frame STM-4.

Based on the teaching of the pointer processing of a frame STM-4, a logical machine performing the state transitions of one second state diagram and of three first state diagrams should also be able to process the single pointer information and the three concatenation informations of the frame STM-4c respectively.

Such a logical machine is relatively expensive and occupies a relatively large surface area when integrated on an electronic chip.

SUMMARY OF THE INVENTION

An object of the present invention is to provide a logical machine of the above known type, but which processes the information of the control field of the frame STM-4c in a more efficient way while using relatively little surface area when integrated on an electronic chip.

According to the present invention, this object is achieved due to the fact that said logical machine performs said state transitions in said predetermined state diagram as a simultaneous function of all the concatenation informations of said transmission frame.

In this way, the first state diagram according to the above CCITT Recommendations is used as a predetermined state diagram for the processing of the three concatenation informations of each frame STM-4c.

Another characteristic feature of the present invention is that said repeated concatenation informations are considered as a single word of control information by said logical machine.

By handling simultaneously the three identical concatenation informations as a single word of control information, the logical machine operates only according to one state diagram, namely the first state diagram, instead of three as mentioned above. This more efficient way of processing also leads to a reduction of the surface area occupied by the logical machine when integrated on an electronic chip.

A further object of the present invention is to make the logical machine even more efficient and to further reduce even the surface area occupied by the logical machine on the chip.

Also according to the present invention, this further object is achieved due to the fact that said pointer information is processed according to a second predetermined state diagram which comprises substantially identical states and similar state transitions as those of the first mentioned state diagram so that a single predetermined state diagram may be derived from both said first and second predetermined state diagrams, and that said logical machine performs state transitions according to said single predetermined state diagram as a simultaneous function of both said pointer information and said concatenation information.

This is the case for the frame STM-4c where the first state diagram of the concatenation information and the second state diagram of the pointer information both have states "NORMal pointer", "Loss Of Pointer" and "Alarm Indication Signal" and corresponding state transitions, as will be explained in more detail later.

Still another characteristic feature of the invention is that both said pointer information and said repeated concatenation informations are considered as a single word of control information by said logical machine.

The solution proposed in the present invention has the advantage of using little hardware by concentrating all the processing in the single state diagram. Moreover, by concentrating the necessary intelligence in this single state diagram, the pointer/concatenation information is processed very simply, i.e. any possible overhead in either complexity or chip area, incurred by processing the different parts of this information separately is avoided.

Another aspect of the present invention is claimed in claim 5.

In this way the logical machine with the above mentioned advantageous features is specifically used for recognizing a frame STM-4c. Indeed, the bytes forming the concatenation information should then equal the predetermined bit sequence. As mentioned earlier this is moreover done simultaneously taking into account the pointer information according to predetermined rules.

Still another aspect of this invention is set out in claim 6.

In so doing any error in the single word processed by the logical machine is taken into account for reaching a predetermined number of consecutive errors irrespective of the fact in which part of the single word this error occurred.

A further important aspect of the present invention is claimed in claim 7.

It can be verified that as long as the three concatenation informations are correct, i.e. that they are equal to a predetermined bit sequence, the single state diagram believes as the second state diagram mentioned above, i.e. as a function of the pointer information. Additionally, when at least one of the concatenation informations is incorrect the single state diagram deviates from the behaviour of this second state diagram in that it also takes into account the concatenation informations forming part of the single word. In conclusion it may be said that the single state diagram maintains a suitable performance regarding the processing of the pointer information, simultaneously checking the concatenation informations, while only introducing a little overhead with respect to the above second state diagram.

Further characteristic features of the present invention are set out in the claims 8 to 14.

BRIEF DESCRIPTION OF THE DRAWINGS

The above mentioned and other objects and features of the invention will become more apparent and the invention itself will be best understood by referring to the following description of an embodiment taken in conjunction with the accompanying drawing which shows a state diagram to be executed by a logical machine according to the present invention.

BEST MODE FOR CARRYING OUT THE INVENTION

Figure 1:
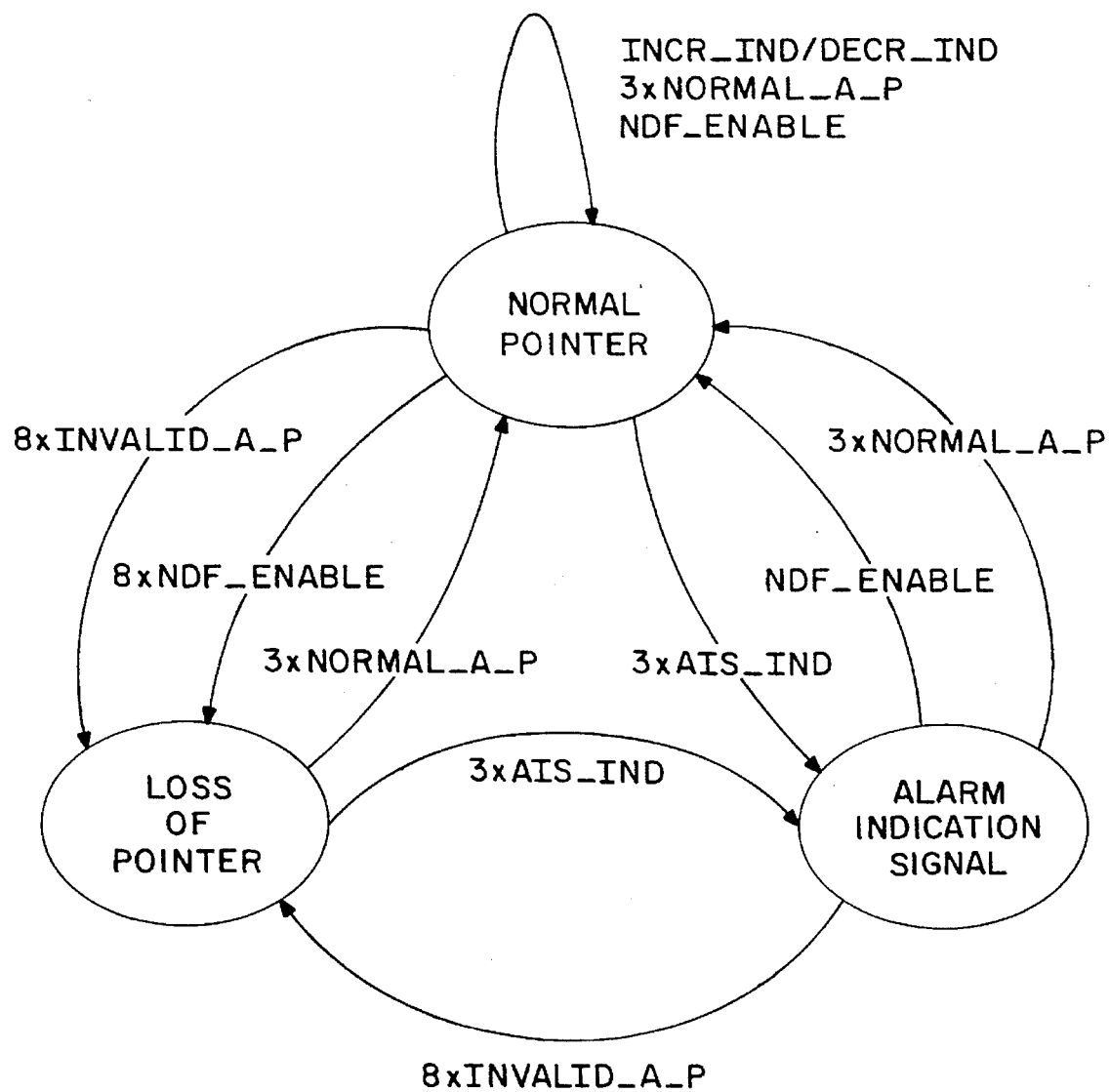

This logical machine operates on control information of telecommunication transmission frames and according to the state diagram shown.

The telecommunication transmission frame is the so-called Synchronous Transport Module (STM) frame STM-4c used in the Synchronous Digital Hierarchy (SDH) protocol and standardized according to the CCITT Recommendations G.707, G.708 and G.709. The frame STM-4c includes a control field also called Administrative Unit OverHead AUOH for storing the control information which includes pointer information and three identical concatenation informations, and a data field which stores a single user data block, or at least a part thereof. The pointer information indicates the start location of the data block in the frame, whilst the concatenation information indicates that the data information is contained in a single data block, i.e. indicates the structure of the data information in the data field.

The frame STM-4c carries multiplexed data information at a transmission rate of 622 Mbit/s.

The SDH protocol multiplexes data information and control information needed for supervisory and other functions, in standardized blocks and puts them respectively in the data field and partly in the control field AUOH which occupy predetermined locations in the frame. However, the data block is not restricted to be multiplexed in a single frame and its place in the bitstream is only determined by a pointer value indicating, relatively to the location of this pointer, the start location of the data block in the frame. As the length of the part of the data block stored in the data field of a particular frame is not fixed since its start location may vary, this data block may cross the boundaries of the data field of the frame to which it belongs and its end location may therefore be in the data field of the next frame to be transmitted or received.

It is to be noted that there exists another Synchronous Transport Module frame STM-4 also standardized by the above CCITT Recommendations. This frame STM-4 differs from the frame STM-4c in that the control field AUOH thereof stores four distinct pointers instead of one pointer and three concatenation informations and that the data field is able to store four data blocks which are byte interleaved and of which the lengths are obviously four times shorter than that of the data block which can be stored in the frame STM-4c. The four different pointers of the frame STM-4 are pointing to the start locations of four different data blocks or containers carrying the data information of four different sources respectively.

By comparing these two frames, one can see that the locations occupied in the frame STM-4 by the three further pointers correspond, in the frame STM-4c, to the three concatenation informations. These three concatenation informations are identical and should equal a standardized bit sequence to be correct. As a consequence, they may be used for distinguishing a frame STM-4c from a frame STM-4 whereby the validity of the received frames, either STM-4c or STM-4, can be continuously checked.

Referring again to the frame STM-4c and according to the Annex B, pages 53 to 55, of the CCITT Recommendation G.783, a logical machine is to be provided for processing the pointer and the concatenation informations of each frame according to well defined and respective state diagrams. However, since the three concatenation informations stored in the control field AUOH of a frame STM-4c are identical, the logical machine according to the present invention will process these three informations simultaneously. In more detail, instead of processing three times the same concatenation information, the logical machine will take the three concatenation informations as a single word and use this single word only once in the state diagram of the concatenation information. Moreover, owing to similitudes between the states and between the state transitions in the state diagrams of both the pointer information and the concatenation informations, the logical machine will process the control field AUOH of a frame STM-4c according to a single state diagram as a function of a single word constituted by the three concatenation informations and the pointer information. This single state diagram has the same states and similar state transitions as the above two state diagrams of the pointer information and the concatenation information respectively. This logical machine will be described in more detail below.

The control field AUOH of the frame STM-4c is received serially at an input of the logical machine and has the following byte sequence:

H A A A S S S S S S S S L B B B S S S S S S S S
wherein each H, A, S, L and B represents a byte.

This byte sequence contains first and second pointer bytes H and L forming together the aforementioned pointer information, three concatenation informations each built-up of first and second concatenation bytes A and B, the combination AB forming one concatenation information, and stuffed bytes S which are irrelevant for further processing in the present logical machine.

The HL bytes, also called H1H2 bytes in the CCITT Recommendations, of the pointer have the following bit sequence:

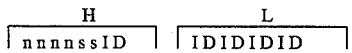

wherein:

n n n n : is a so-called New Data Flag NDF which is said to be enabled when it has the value 1 0 0 1, and disabled or normal when it has the value 0 1 1 0. It is to be noted that in this case of pointer information it is sufficient that three of the four NDF bits match with 1 0 0 1 for enabling the NDF;

s s : are so-called "ss" bits which are said to be correct when they have the value 1 0;

I : are increment bits;

D : are decrement bits; and

I D I D I D I D : is a pointer value which is valid when it is in a predetermined range from 0 to 782.

The AB bytes of each concatenation information have the following bit sequence:

A B

wherein:

n n n n : is the above new data flag NDF which has to be enabled for validating the concatenation information;

x x : are non relevant bits for the present application; and the remaining bits all have the binary value 1 for indicating that the concatenation information is correct, i.e. that a frame STM-4c is received.

The logical machine discards the stuffed bytes S and forms a single word H A A A L B B B which is processed according to the state diagram shown in the drawing and which will be described hereafter.

It is to be noted that in the following part of the description, the names and symbols used correspond generally to those defined in the above CCITT Recommendations.

The state diagram comprises three states:

a NORMal pointer state "NORM";

a Loss Of Pointer state "LOP"; and an Alarm Indication Signal state "AIS".

In these states, the word "pointer" refers to the above single word constituted by the pointer information and the three concatenation informations, whereas the logical machine latches a current pointer which indicates the current start location of the data block in the frame STM-4c.

State transitions linking these states may be generated when any one of the following types of single words is received one or more consecutive times, i.e. during one or during consecutive frames, in the logical machine:

a NORMAL Arriving Pointer "NORMAL_A_P";

a New Data Flag ENABLE "NDF_ENABLE";

an Alarm Indication Signal "AIS_IND";

an INCRement INDication "INCR_IND";

a DECRement INDication "DECR_IND"; and an INVALID Arriving Pointer "INVALID_A_P".

In more detail, a normal arriving pointer NORMAL_A_P is considered to be received when the new data flag NDF is disabled, the ss bits are correct, the received pointer value is in the predetermined range and the three concatenation informations are correct.

A new data flag enable NDF_ENABLE is considered to be received when the NDF is enabled, the ss bits are correct, the received pointer value is in the predetermined range, and the three concatenation informations are correct.

An alarm indication signal AIS_IND is considered to be received when the control information, i.e. the single word H A A A L B B B, contains only binary ones (1).

An increment/decrement indication INCR_IND/DECR_IND is considered to be received when the NDF is disabled, the ss bits are correct, a majority of I/D-bits are inverted, a majority of D/I-bits are not inverted, a previous INCR_IND/DECR_IND or NDF_ENABLE has occurred more than three frames ago and the three concatenation informations are correct respectively. A majority of, e.g., I-bits are said to be inverted when at least three I-bits of five are inverted with respect to the I-bits received in the previous frame.

Finally, an invalid arriving pointer INVALID_A_P is considered to be received for any other than the above defined single words or for a NORMAL_A_P for which the received pointer value is not equal to the current pointer.

In the present logical machine the following state transitions may occur:

* from the normal pointer state NORM to this same normal pointer state NORM when:

one increment/decrement indication INCR_IND/DECR_IND is received: the new current pointer is then equal to the previous current pointer +/−1, modulo 782;

3 identical normal arriving pointers 3×NORMAL_A_P are received in three consecutive frames: the new current pointer is then equal to the received pointer value; or one new data flag enable NDF_ENABLE is received: the new current pointer is equal to the received pointer value;

* from the normal pointer state NORM to the loss of pointer state LOP when:

N invalid arriving pointers N×INVALID_A_P are received in N consecutive frames; or N non data flag enable N×NDF_ENABLE are received in N consecutive frames;

* from the loss of pointer state LOP to the normal pointer state NORM when:

3 identical normal arriving pointers 3×NORMAL_A_P are received in three consecutive frames: the new current pointer is then equal to the received pointer value;

* from the normal pointer state NORM to the alarm indication signal state AIS when:

3 alarm indication signals 3×AIS_IND are received in three consecutive frames;

* from the alarm indication signal state AIS to the normal pointer state NORM when:

3 identical normal arriving pointers 3×NORMAL_A_P are received in three consecutive frames: the new current pointer is then equal to the received pointer value; or one non data flag enable NDF_ENABLE is received: the new current pointer is then equal to the received pointer value;

* from the loss of pointer state LOP to the alarm indication signal state AIS when:

3 alarm indication signals 3×AIS_IND are received in three consecutive frames; and

* from the alarm indication signal state AIS to the loss of pointer state LOP when:

N invalid arriving pointers N×INVALID_A_P are received in N consecutive frames.

In the above, N is an integer having a value comprised between 8 and 10.

When the logical machine is in the state LOP, the current pointer is undefined and an indication is given to a maintenance device (not shown) and the data information of the frame is discarded. Similarly, when the logical machine is in the state AIS, an alarm is indicated to the maintenance device and the data information of the frame is discarded.

The above logical machine reacts to the contents of the control information of the frame STM-4c in almost the same way as a logical machine for the frame STM-4 reacts to the contents of each of the four pointers of that frame, except that the extra demand for the correctness of the concatenation informations is now checked simultaneously. The overhead introduced by checking these concatenation informations is thus minimal with regards to chip area and circuit complexity. Indeed, in the present logical machine only the four single words NORMAL_A_P, NDF_ENABLE, INCR_IND and DECR_IND are, with respect to their definitions given for a pointer only, redefined to take into account the three concatenation informations.

It is to be noted that another embodiment of the present logical machine could equally well be used in the case of mixed frames STM-4 and STM-4c over the same transmission link. This logical machine should then for instance process the first pointer, i.e. the left most pointer in the control field, simultaneously with the other bytes of the single word, i.e. the above AB bytes, and thereby make a distinction between a frame STM-4c and a frame STM-4. From the above description, it will be relatively simple to realize such a variant of the present logical machine and the latter will therefore not be described in more detail.

While the principles of the invention have been described above in connection with specific apparatus, it is to be clearly understood that this description is made only by way of example and not as a limitation on the scope of the invention.

We claim:

1. A method for determining with a logical machine valid data in a transmission signal having a data information signal and a control information signal with a pointer information signal and a repeated concatenation information signal, the pointer information signal indicating a location of the data information signal in the transmission signal, and the repeated concatenation information signal indicating the data structure of the data information signals, comprising the steps of:

providing a logical machine;

operating the logical machine according to a single predetermined state diagram having state transitions;

receiving the transmission signal at an input of the logical machine;

simultaneously performing the state transitions on the repeated concatenation information signal with the logical machine; and generating a pointer and data indication signal indicating whether a pointer is defined and the data information signal is valid in the transmission signal.

2. A method according to claim 1, wherein the method further comprises a step of forming the repeated concatenation information signal into a single digital word before performing the state transitions.

3. A method according to claim 1, wherein the step of performing further includes simultaneously performing the state transitions on both the pointer information signal and the repeated concatenation information signal with the logical machine.

4. A method according to claim 3, wherein the method further comprises the step of forming the pointer information signal and the repeated concatenation information signal into a single digital word of control information before performing the state transitions.

5. A method according to claim 1, wherein the method further comprises steps of:

checking with the logical machine whether the concatenation information signal differs from a predetermined bit sequence indicating the data structure, and if so, then generating an error indication signal; and simultaneously checking with the logical machine the pointer information signal according to a predetermined set of rules.

6. A method according to claim 4, wherein the method further includes steps of:

detecting with the logical machine errors in any part of the single digital word of control information; and changing the state of the single predetermined state diagram to a loss of pointer state (LOP) when errors are detected in a predetermined number such as eight (8) consecutive ones in the transmission signal.

7. A method according to claim 4, wherein the step of performing further includes the steps of performing the following state transitions:

changing from a loss of pointer state (LOP) to a normal pointer state (NORM) when the control information signal is correct in X consecutive frames, where X is an integer greater than one;

changing from either the loss of pointer state (LOP) or the normal pointer state (NORM) to an alarm indication signal state (AIS) if the control information signal is in Y consecutive frames equal to an alarm indication (AIS_IND), the alarm indication (AIS_IND) being a word having a predetermined bit pattern, where Y is an integer greater than one, and changing from the normal pointer state (NORM) to the loss of pointer state (LOP) when an invalid pointer (INVALID_A_P) is detected in Z consecutive frames, where Z in an integer greater than one, the invalid pointer being detected when the control information is not correct and is different from the alarm indication (AIS_IND).

8. A method according to claim 7, wherein the step of performing further includes the steps of performing the following state transition with X as an integer equal to 3, Y as an integer equal to 3 and Z as an integer ranging from 8 to 10.

9. A method according to claim 4, wherein the step of performing further includes the steps of performing the following state transitions, as follows:

changing from the alarm indication signal state (AIS) to the normal pointer state (NORM) when the control information signal is correct in P consecutive frames, where P is an integer greater than one; and changing from the alarm indication signal state (AIS) to the loss of pointer state (LOP) when an invalid pointer (INVALID_A_P) is detected in Q consecutive frames, where Q is an integer greater than one.

10. A method according to claim 9, wherein the step of performing further includes the step of performing the state transitions with P as an integer equal to 3 and Q as an integer in the range of 8 to 10.

11. A method according to claim 9, wherein the method further includes steps of:

transmitting the transmission signal according to the Synchronous Digital Hierarchy (SDH) protocol;

defining a structure of the transmission signal according to the Synchronous Transport Module (STM) STM-4c of the CCITT Recommendation G.709; and defining the single digital word of the control information signal to contain one pointer information signal and three concatenation information signals.

12. A method according to claim 11, wherein the method further includes steps of interpreting the control information signal, as follows:

defining a normal arriving pointer signal (NORMAL_A_P) when the new data flag (NDF) is disabled, the "ss" bits are correct, the received pointer value is in a predetermined range and the three concatenation information signals are correct;

defining a new data flag enable signal (NDF_ENABLE) when the new data flag is enabled, the "ss" bits are correct, the received pointer value is in the predetermined range, and the three concatenation information signals are correct;

defining an alarm indication signal (AIS_IND) when the control information contains only binary ones;

defining an increment/decrement indication signal (INCR_IND/DECR_IND) when the new data flag (NDF) is disabled, the "ss" bits are correct, a majority of "I-bits"/"D-bits" is inverted, a majority of "D-bits"/"I-bits" is not inverted, a previous increment/decrement indication (INCR_IND/DECR_IND) or new data flag enable (NDF_ENABLE) has occurred more than three frames ago and the three concatenation information signals are correct; and defining an invalid arriving pointer signal (INVALID_A_P) for any other than the above defined control information signal or for a normal arriving pointer signal (NORMAL_A_P) with a received pointer value which is not equal to the current pointer; and the step of performing includes performing the following state transitions:

(A) from the normal pointer state (NORM) to the same normal pointer state (NORM) when:

(1) an increment/decrement indication signal (INCR_IND/DECR_IND) is received, with the new current pointer becoming equal to the previous current pointer +/−1, modulo 782;

(2) 3 identical normal arriving pointer signals (3×NORMAL_A_P) are received in three consecutive frames, with the new current pointer becoming equal to the received pointer valuer; or (3) a new data flag enable signal (NDF_ENABLE) is received, with the new current pointer becoming equal to the received pointer value;

(B) from the normal pointer state (NORM) to the loss of pointer state (LOP) when:

(1) N invalid arriving pointer signals (N×INVALID_A_P) are received in N consecutive frames; or (2) N new data flag enable signal (N×NDF_ENABLE) are received in N consecutive frames;

(C) from the normal pointer state (NORM) to the alarm indication signal state (AIS) when: 3 alarm indication signals (3×AIS_IND) are received in three consecutive frames;

(D) from the loss of pointer state (LOP) to the normal pointer state (NORM) when: 3 normal arriving pointer signals (3× NORMAL_A_P) are received;

(E) from the loss of pointer state (LOP) to the alarm indication signal state (AIS) when: 3 alarm indication signals (3 ×AIS_IND) are received;

(F) from the alarm indication signal state (AIS) to the normal pointer state (NORM) when:

(1) 3 normal arriving pointer signals (3× NORMAL_A_P) are received; or (2) a new data flag enable signal (NDF_ENABLE) is received; and (G) from the alarm indication signal state (AIS) to the loss of pointer state (LOP) when: N invalid arriving pointer signals (N×INVALID_A_P) are received; where N is an integer greater than one.

13. A method according to claim 12, wherein the steps of providing further includes providing the logical machine on an integrated electronic chip.

14. A method according to claim 1, wherein the steps of providing further includes providing the logical machine on an integrated electronic chip.

15. A method according to claim 7, wherein the method further includes the steps of:

transmitting the transmission signal according to the Synchronous Digital Hierarchy (SDH) protocol;

defining a structure of the transmission signal according to the Synchronous Transport Module (STM) STM-4c of the CCITT Recommendation G.709; and defining the single word of control information to contain one pointer information signal and three concatenation information signals.

16. A method according to claim 15, wherein the method further includes the steps of interpreting the control information signal, as follows:

defining a normal arriving pointer signal (NORMAL_A_P) when the new data flag (NDF) is disabled, the "ss" bits are correct, the received pointer value is in a predetermined range and the three concatenation information signals are correct;

defining a new data flag enable signal (NDF_ENABLE) when the new data flag is enabled, the "ss" bits are correct, the received pointer value is in the predetermined range, and the three concatenation information signals are correct;

defining an alarm indication signal (AIS_IND) when the control information contains only binary ones;

defining an increment/decrement indication signal (INCR_IND/DECR_IND) when the new data flag (NDF) is disabled, the "ss" bits are correct, a majority of "I-bits"/"D-bits" is inverted, a majority of "D-bits"/"I-bits" is not inverted, a previous increment/decrement indication (INCR_IND/DECR_IND) or new data flag enable (NDF_ENABLE) has occurred more than three frames ago and the three concatenation information signals are correct; and defining an invalid arriving pointer signal (INVALID_A_P) for any other than the above defined control information signal or for a normal arriving pointer signal (NORMAL_A_P) with a received pointer value which is not equal to the current pointer;

and the step of performing includes performing the following state transitions:

(A) from the normal pointer state (NORM) to the same normal pointer state (NORM) when:

(1) an increment/decrement indication signal (INCR_IND/DECR_IND) is received, with the new current pointer becoming equal to the previous current pointer −/−1, modulo 782;
   (2) 3 identical normal arriving pointer signals (3×NORMAL_A_P) are received in three consecutive frames, with the new current pointer becoming equal to the received pointer valuer; or
   (3) a new data flag enable signal (NDF_ENABLE) is received, with the new current pointer becoming equal to the received pointer value;
(B) from the normal pointer state (NORM) to the loss of pointer state (LOP) when:
   (1) N invalid arriving pointer signals (N×INVALID_A_P) are received in N consecutive frames; or
   (2) N new data flag enable signal (N×NDF_ENABLE) are received in N consecutive frames;
(C) from the normal pointer state (NORM) to the alarm indication signal stage (AIS) when: 3 alarm indication signals (3 ×AIS_IND) are received in three consecutive frames;
(D) from the loss of pointer state (LOP) to the normal pointer state (NORM) when: 3 normal arriving pointer signals (3× NORMAL_A_P) are received;
(E) from the loss of pointer state (LOP) to the alarm indication signal state (AIS) when: 3 alarm indication signals (3× AIS_IND) are received;
(F) from the alarm indication signal state (AIS) to the normal pointer state (NORM) when:
   (1) 3 normal arriving pointer signals (3× NORMAL_A_P) are received; or
   (2) a new data flag enable signal (NDF_ENABLE) is received; and
(G) from the alarm indication signal state (AIS) to the loss of pointer state (LOP) when: N invalid arriving pointer signals (N×INVALID_A_P) are received; where N is an integer greater than one.

17. A method according to claim 16, wherein the step of performing further includes performing the state transitions with N as an integer in a range of 8 to 10.

18. A method according to claim 1, wherein the step of operating further includes operating the logical machine with a single predetermined state diagram having state transitions including a normal pointer state, a loss of pointer state, and an alarm state; and the step of generating further comprises the steps of:
   generating a normal pointer indication signal indicating a normal pointer is defined and the data information signal is valid if the local machine is in the normal pointer state,
   generating a loss of pointer indication signal indicating that a current pointer is undefined and the data information is discarded if the local machine is in the loss of pointer state, or
   generating an alarm indication signal indicating an alarm and that the data information is discarded if the local machine is in the alarm indication state.

\* \* \* \* \*

UNITED STATES PATENT AND TRADEMARK OFFICE
CERTIFICATE OF CORRECTION

PATENT NO. : 5,471,477
DATED : Nov. 28, 1995
INVENTOR(S) : Dries et al.

It is certified that error appears in the above-indentified patent and that said Letters Patent is hereby corrected as shown below:

At column 11, line 1, please change "-/- 1" to --+/- 1--.

Signed and Sealed this

Nineteenth Day of March, 1996

Attest:

BRUCE LEHMAN

Attesting Officer     Commissioner of Patents and Trademarks